US012113560B2

(12) United States Patent
Wang et al.

(10) Patent No.: US 12,113,560 B2
(45) Date of Patent: Oct. 8, 2024

(54) METHOD FOR IMPLEMENTING PREDISTORTION COMPENSATION PROCESSING FOR 5G NR IN-BAND MODULATED SIGNALS

(71) Applicants: Nanjing Transcom Information Technology Co., Ltd., Nanjing (CN); Transcom (Shanghai) Technology Co., Ltd., Shanghai (CN)

(72) Inventors: Zhi Wang, Nanjing (CN); Xiangmin Chen, Nanjing (CN)

(73) Assignees: Nanjing Transcom Information Tech. Co. Ltd, Nanjing (CN); Transcom (Shanghai) Technology Co. Ltd., Shanghai (CN)

(*) Notice: Subject to any disclaimer, the term of this patent is extended or adjusted under 35 U.S.C. 154(b) by 0 days.

(21) Appl. No.: 17/911,489

(22) PCT Filed: Apr. 30, 2020

(86) PCT No.: PCT/CN2020/088119
§ 371 (c)(1),
(2) Date: Sep. 14, 2022

(87) PCT Pub. No.: WO2021/184499
PCT Pub. Date: Sep. 23, 2021

(65) Prior Publication Data
US 2023/0097877 A1   Mar. 30, 2023

(30) Foreign Application Priority Data
Mar. 18, 2020   (CN) .................. 202010191787.X

(51) Int. Cl.
*H04B 1/04*   (2006.01)

(52) U.S. Cl.
CPC ... *H04B 1/0475* (2013.01); *H04B 2001/0425* (2013.01)

(58) Field of Classification Search
CPC .................. H04B 1/0475; H04B 2001/0425
(Continued)

(56) References Cited

U.S. PATENT DOCUMENTS

2014/0294057 A1* 10/2014 Joung ................... H04L 27/364
375/232
2015/0256216 A1   9/2015 Ding et al.
(Continued)

FOREIGN PATENT DOCUMENTS

| CN | 102694758 A | * | 9/2012 |
|---|---|---|---|
| CN | 110166007 A |   | 8/2019 |

(Continued)

OTHER PUBLICATIONS

Int'l Search Report for PCT/CN2020/088119, dated Dec. 17, 2020.
(Continued)

*Primary Examiner* — Kevin M Burd
(74) *Attorney, Agent, or Firm* — MaxGoLaw PLLC

(57) ABSTRACT

A method for realizing predistortion compensation processing for 5G NR in-band modulated signals includes configuring the modulator to output a continuous wave signal, switch the output frequency interval of the signal to be consistent with the 5G NR subcarrier bandwidth, and record the power value P0 corresponding to the current frequency through the power meter. The power measurement difference between all points and P0 is calculated and performs normalization, and generates a compensated channel impulse response after shaping filtering; converts it into a power compensation factor in the time domain; performs inverse Fourier transform to generate I and Q baseband signals; generates compensated baseband data; the gener-
(Continued)

ated baseband data is filtered, and an analog zero intermediate frequency signal is generated, which is input to the broadband demodulator for frequency conversion modulation of the 5G NR broadband signal. The method operates without the need to modify the device circuit in the channel.

3 Claims, 4 Drawing Sheets

(58) Field of Classification Search
USPC .......................................................... 375/297
See application file for complete search history.

(56) References Cited

U.S. PATENT DOCUMENTS

2019/0081770 A1* 3/2019 Zhao ..................... H04L 5/1469
2019/0182021 A1* 6/2019 Shokri Razaghi .... H04L 5/1469

FOREIGN PATENT DOCUMENTS

| CN | 110266276 A | 9/2019 |
|---|---|---|
| CN | 110730055 A | 1/2020 |

OTHER PUBLICATIONS

Cappello. Tommaso et al. "Supply and Load-Modulated Balanced Amplifier for Efficient Broadband 5G Base Stations", IEEE Transactions on Microwave Theory and Techniques, Jul. 31, 2019 (Jul. 31, 2019) (Abstract only).

* cited by examiner

METHOD FOR IMPLEMENTING PREDISTORTION COMPENSATION PROCESSING FOR 5G NR IN-BAND MODULATED SIGNALS

FIELD OF TECHNOLOGY

The present invention relates to the field of 5G communication, in particular to the field of research and development and testing of mobile communication instruments, specifically, it refers to a method for implementing predistortion compensation processing for 5G NR in-band modulated signals.

DESCRIPTION OF RELATED ARTS

With the rapid development of 5G communication, the requirements for 5G test instruments are getting higher and higher, especially the requirements for instantaneous bandwidth are getting wider and wider, Sub6G requires the maximum modulation bandwidth to be 200 MHz, and the bandwidth of the millimeter wave band is even 1 GHz, due to the influence of device, board and industrial design, the problems of poor inband spectrum ripple and phase consistency within the bandwidth of the 5G broadband modulation signal will occur.

The traditional method to solve the problem of poor inband spectrum ripple and phase consistency within the bandwidth of 5G broadband modulation signals is to correct the different device circuits of the signal generation channel, in turn, the inband spectrum ripple and phase consistency of the broadband modulated signal are improved. Although this method can bring some improvement by modifying the hardware device circuit, the effect is very limited, at the same time, due to the poor consistency of different PCB boards, it is necessary to debug each board separately, which not only takes a long time for debugging and calibration, but also cannot achieve the desired effect.

SUMMARY OF THE INVENTION

The purpose of the present invention is to overcome the shortcomings of the above-mentioned prior art, and to provide a method for realizing predistortion compensation processing for 5G NR (New Radio, new air interface) in-band modulated signals that satisfies the requirements of simple operation, high efficiency, and wide application range.

In order to achieve the above objects, the method for implementing predistortion compensation processing for 5G NR in-band modulated signals of the present invention is as follows:

The Method for implementing predistortion compensation processing for 5G NR in-band modulated signals, its main feature is that the method includes the following steps:
(1) Configure the modulator to output a continuous wave signal, switch the output frequency interval of the signal to be consistent with the 5G NR subcarrier bandwidth, and record the power value Pn corresponding to the current frequency through the power meter;
(2) According to the power value P0 measured by the power meter, calculate the power measurement difference between all points and Pn, taking P0 as the reference point, perform normalization, and generate a compensated channel impulse response after shaping filtering;
(3) Perform inverse Fourier transform on the channel impulse response and convert it into a power compensation factor in the time domain;
(4) Perform inverse Fourier transform on the original baseband signal generated by 5G NR according to different symbols to generate I and Q baseband signals;
(5) Multiply the power compensation factor with the I and Q baseband signals point by point to generate compensated baseband data;
(6) The generated baseband data is filtered, digital-to-analog conversion is performed, and an analog zero intermediate frequency signal is generated, which is input to the broadband demodulator for frequency conversion modulation of the 5G NR broadband signal.

Preferably, the step (1) specifically includes the following steps:
(1.1) Turn on the frequency synthesizer to generate the reference signal for the wideband modulator;
(1.2) A continuous wave signal is generated by a wideband modulator, and the signal is sent through a fixed-gain RF channel;
(1.3) The power measurement is performed by the signal receiving device to obtain the power measurement values of different frequency points.

Preferably, in the step (5), the baseband data is generated according to the I and Q baseband signals, specifically:

The baseband data is generated from the I and Q baseband signals according to the following formula:

$$Ali(n)=Nli(n)\times H(n);$$

$$Alq(n)=Nlq(n)\times H(n);$$

Among them, Nli(n) and Nlq(n) are I and Q baseband signals respectively, H(n) is a power compensation factor, n=0, 1, . . . , 4095.

Preferably, in the step (1), the sub-carrier bandwidths are configured as 15 kHz, 30 kHz and 60 kHz.

Preferably, the filter in the step (6) is a root raised cosine filter, and the roll-off coefficient is 0.22.

The method for implementing predistortion compensation processing for 5G NR in-band modulated signals of the present invention is adopted, by measuring the power difference of the output continuous wave signal of the modulation channel in advance, the unbalance degree in the test band is predicted, and then the impulse response of the difference channel is calculated; Combined with the characteristics of 5G NR subcarrier allocation and resource occupation, predistortion compensation is performed without the need to modify the device circuit in the channel, thus achieving the purpose of compensating the entire transmission channel. This method not only greatly improves the in-band flatness and phase consistency indicators within the bandwidth of the 5G broadband modulated signal, but also improves the efficiency of research and development and production.

DETAILED DESCRIPTION OF THE PREFERRED EMBODIMENT

In order to be able to understand the technical content of the present invention more clearly, is further exemplified by the following detailed description of embodiments.

Figure 1:
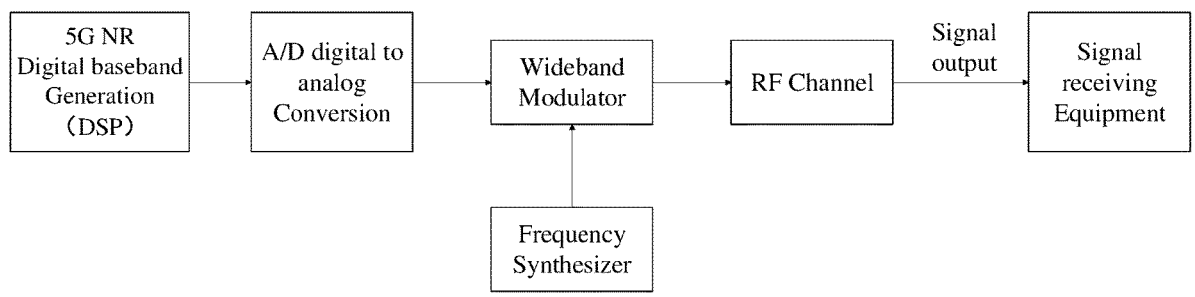
FIG. 1 is a block diagram of in-band compensation and signal generation of a method for implementing predistortion compensation processing for a 5G NR in-band modulated signal according to the present invention.
Figure 2:
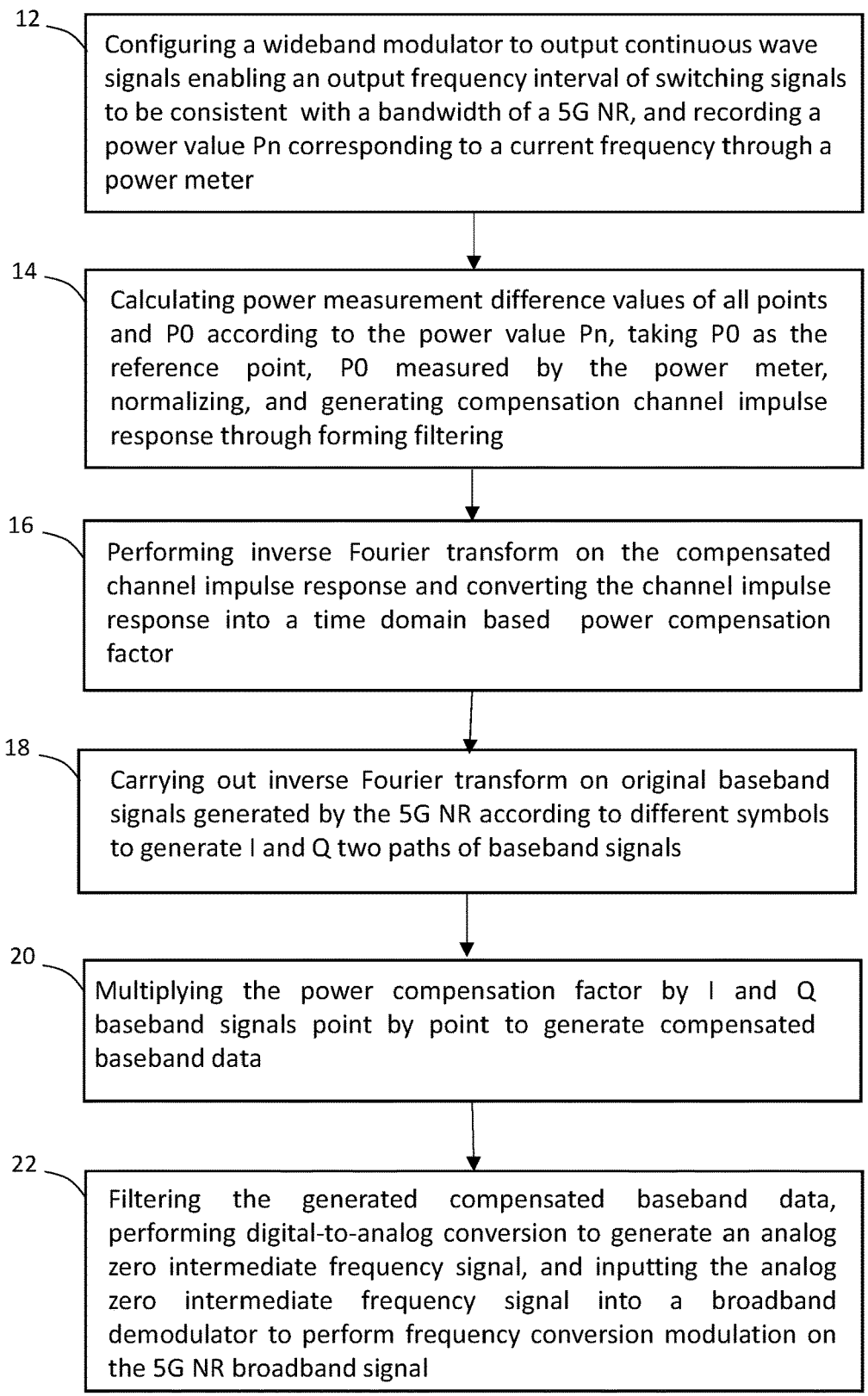
FIG. 2 is a flowchart of a method for implementing predistortion compensation processing for a 5G NR in-band modulated signal in accordance with embodiments of the invention.

The method for implementing predistortion compensation processing for a 5G NR in-band modulated signals of the present invention, wherein the method includes the following steps as shown in FIG. 2 as method 10:

(1) Configure the modulator to output a continuous wave signal, switch the output frequency interval of the signal to be consistent with the 5G NR subcarrier bandwidth, and record the power value P0 corresponding to the current frequency through the power meter (Block 12);

(2) According to the power value P0 measured by the power meter, calculate the power measurement difference between all points and P0, perform normalization, and generate a compensated channel impulse response after shaping filtering (Block 14);

(3) Perform inverse Fourier transform on the channel impulse response and convert it into a power compensation factor in the time domain (Block 16);

(4) Perform inverse Fourier transform on the original baseband signal generated by 5G NR according to different symbols to generate I and Q baseband signals (Block 18);

(5) Multiply the power compensation factor with the I and Q baseband signals point by point to generate compensated baseband data (Block 20);

(6) The generated baseband data is filtered, digital-to-analog conversion is performed, and an analog zero intermediate frequency signal is generated, which is input to the broadband demodulator for frequency conversion modulation of the 5G NR broadband signal (Block 22).

As a preferred embodiment of the present invention, in the step (5), the baseband data is generated according to the I and Q baseband signals, specifically:

The baseband data is generated from the I and Q baseband signals according to the following formula:

$$AIi(n)=NIi(n) \times H(n);$$

$$AIq(n)=NIq(n) \times H(n);$$

Among them, NIi(n) and NIq(n) are I and Q baseband signals respectively, H(n) is a power compensation factor, n=0, 1, . . . , 4095.

As a preferred embodiment of the present invention, in the step (1), the sub-carrier bandwidths are configured as 15 kHz, 30 kHz and 60 kHz.

As a preferred embodiment of the present invention, the filter in the step (6) is a root raised cosine filter, and the roll-off coefficient is 0.22.

In a specific embodiment of the present invention, applied to a device for 5G NR signal generation, the specific implementation method includes the following steps: configuring the modulator to output a continuous wave signal, switching the output frequency interval of the signal to be consistent with the 5G NR subcarrier bandwidth, and record the power value corresponding to the current frequency through the power meter; the power value Pn measured by the power meter takes P0 as the reference point, calculates the power measurement difference between all points and P0, and normalizes the power difference into the channel impulse response; perform the inverse Fourier transform of the obtained channel impulse response on a fixed point, and convert it into a power compensation factor H(n) in the time domain; the original baseband signal generated by 5G NR is subjected to IFFT (inverse Fourier transform) according to different symbols to generate two I and Q two baseband signals; multiply the power compensation factor/Q baseband data point by point to generate the compensated baseband data; filter the generated baseband data, and then send it to the A/D for digital-to-analog conversion to generate an analog zero-IF signal and then enter the broadband demodulator for frequency conversion modulation of 5G NR broadband signal.

The present invention provides a predistortion method for 5G NR wideband modulated signals of different frequencies, which effectively improves the inband spectrum ripple of the 5G NR wideband modulated signals, it effectively reduces the bit error rate in the process of signal transmission, improves the quality of the modulated signal, and can be widely used in 5G NR signal generation equipment.

The 5G NR (New Radio, new air interface) in-band modulation signal predistortion compensation method in the present invention measures the power difference of the output continuous wave signal of the modulation channel in advance, pre-tests the in-band imbalance, and then calculates the difference channel impulse response; combined with the characteristics of 5G NR subcarrier allocation and resource occupation, predistortion compensation is performed without the need to modify the device circuit in the channel, thus achieving the purpose of compensating the entire transmission channel. This method not only greatly improves the inband spectrum ripple and phase consistency indicators within the bandwidth of the 5G broadband modulated signal, but also improves the efficiency of research and development and production.

In a specific embodiment of the present invention, the 5G NR in-band modulated signal predistortion compensation method specifically includes the following steps:

1) Configure the modulator to output a continuous wave signal, switch the output frequency interval of the signal to be consistent with the 5G NR subcarrier bandwidth, and record the power value Pn corresponding to the current frequency through the power meter, where n=0, 1 . . . N_RB×n_RB_SC, N_RB is the number of fully allocated RBs under different subcarrier bandwidths, and n_RB_SC is the subcarrier spacing.

2) According to the power value Pn measured by the power meter in 1), take P0 as the reference point, calculate the power measurement difference between all points and P0, and normalize the power difference to generate a compensated channel impulse response through shaping filtering.

3) Perform 4096-point inverse Fourier transform on the channel impulse response obtained in 2), and convert it into a power compensation factor H(n) in the time domain, n=0, 1, . . . , 4095.

4) The original baseband signal generated by 5G NR is subjected to IFFT (inverse Fourier transform) according to different symbols 1 to generate two I and Q two baseband signals Nli(k), Nlq(k), where n=0, 1 . . . 4095.

5) Multiply the power compensation factor in 3) with Nli(k) and Nlq(k) in the I/Q two channels in 4) point by point to generate the compensated baseband data. The generation formula is:

$$Ali(n)=Nli(n)\times H(n);$$

$$Alq(n)=Nlq(n)\times H(n);$$

Where n=0, 1, . . . , 4095.

6) The generated baseband data is filtered, and then sent to the A/D for digital-to-analog conversion to generate an analog zero-IF signal and then enter the broadband demodulator for frequency conversion modulation of the 5G NR broadband signal.

Step 1) the subcarrier bandwidths are configured as 15 kHz, 30 kHz and 60 kHz, and the number of fully configured RBs is 275 RBs.

The formula for inverse Fourier transform of the channel impulse response in step 4) is:

$$s_l^{(p,\mu)}(t) = \sum_{k=0}^{N_{grid}^{size,\mu} N_{sc}^{RB}-1} a_{k,l}^{(p,\mu)} \cdot e^{j2\pi\left(k+k_0^\mu-N_{grid,x}^{size,\mu}N_{sc}^{RB}/2\right)\Delta f\left(t-N_{CP,l}^\mu T_c-t_{start,l}^\mu\right)}$$

$$k_0^\mu = \left(N_{grid,x}^{start,\mu} + N_{grid,x}^{size,\mu}/2\right)N_{sc}^{RB} - \left(N_{grid,x}^{start,\mu_0} + N_{grid,x}^{size,\mu_0}/2\right)N_{sc}^{RB}2^{\mu_0-\mu}$$

Among them, $t_{start,l}^\mu \leq t < t_{start,l}^\mu + (N_u^\mu + N_{CP,l}^\mu)T_c$ is a time interval between subframes.

$$N_u^\mu = 2048\kappa \cdot 2^{-\mu}$$

$$N_{CP,l}^\mu = \begin{cases} 512\kappa \cdot 2^{-\mu} & \text{extended cyclic prefix} \\ 144\kappa \cdot 2^{-\mu} + 16\kappa & \text{normal cyclic prefix, } l=0 \text{ or } l=7\cdot 2^\mu \\ 144\kappa \cdot 2^{-\mu} & \text{normal cyclic prefix, } l\neq 0 \text{ and } l\neq 7\cdot 2^\mu \end{cases}$$

Among them, μ is the subcarrier bandwidth configuration, l is the symbol position, TC is the time interval between chips, k is a ratio calculated according to different subcarrier bandwidths, $N_{sc}^{RB}$ is the number of resource units in an RB. number, $N_{CP,l}^\mu$ is the cyclic prefix length under different subcarrier configuration conditions.

The filter in step 6) adopts a root raised cosine filter with a roll-off coefficient of 0.22, which is used for filtering shaping.

The calibration compensation and signal process comprises of the following steps:

Step 1, compensation impulse response acquisition process: control the digital-to-analog converter not to output, turn on the frequency synthesizer to generate the reference signal of the wideband modulator, generate the continuous wave signal through the wideband modulator, and send it out through the fixed gain radio frequency channel, use signal receiving equipment (such as power meter, spectrum analyzer, etc.) for power measurement to obtain the power measurement value of different frequency points, and then to obtain the power difference value of different frequency points, through normalization, the differential channel impulse response is generated by normalization, shaping filtering and Fourier transform.

Step 2, digital compensation process emission process: in DSP, the difference channel impulse response generated by inverse Fourier transform is multiplied point by point to realize output gain compensation to different subcarrier units; the compensated data is converted to digital-to-analog by A/D to generate a zero-IF analog signal, which is sent to the broadband modulator, and then output by radio frequency to realize the compensation of the imbalance of the entire signal generation channel by performing pre-distortion compensation on the digital baseband, effectively improve the signal quality.

Figure 3:
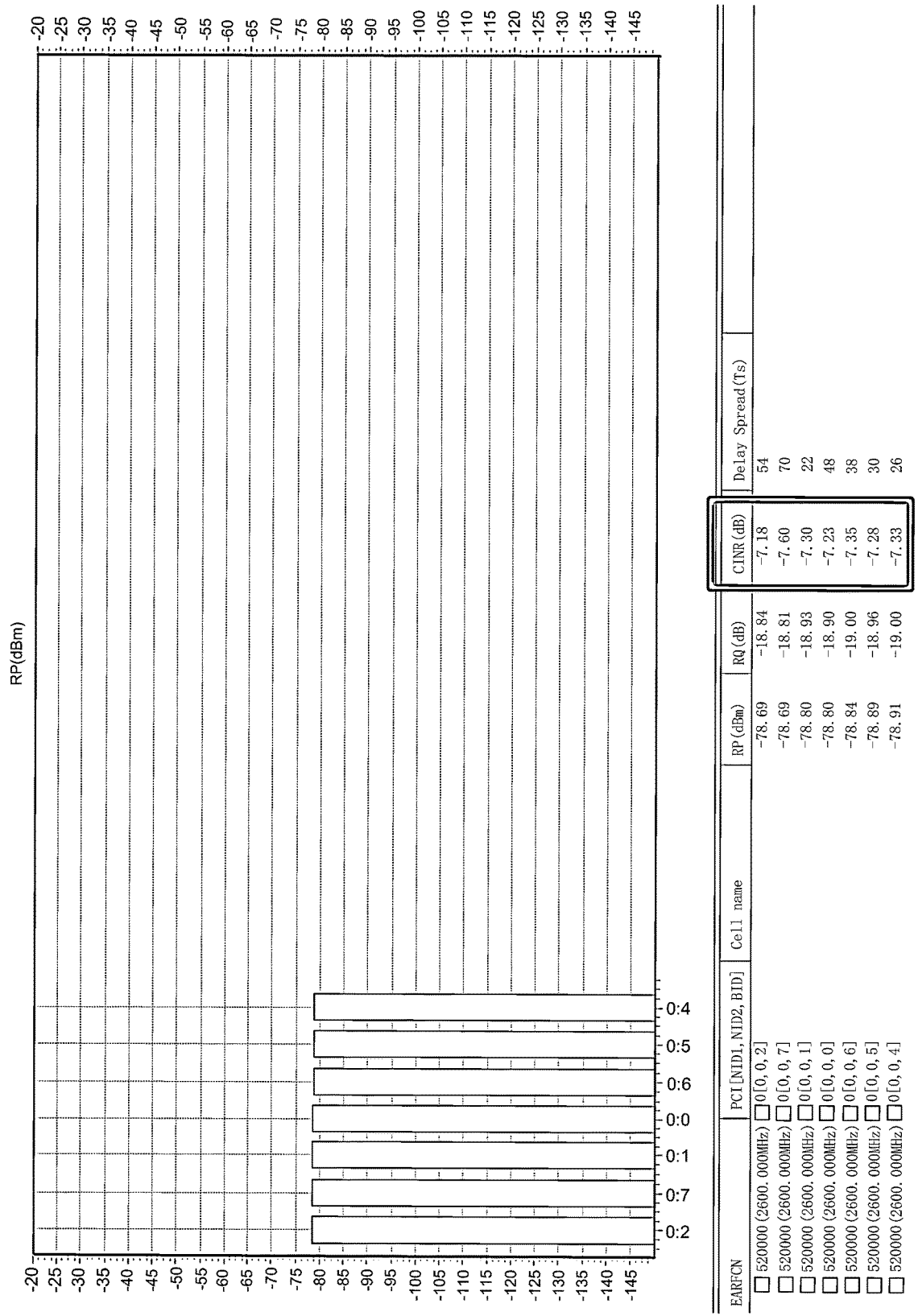
FIG. 3 is a schematic diagram of the quality of the 5G NR signal before the predistortion compensation of the 5G NR signal of the method for implementing the predistortion compensation processing for the 5G NR in-band modulated signal according to the present invention.
Figure 4:
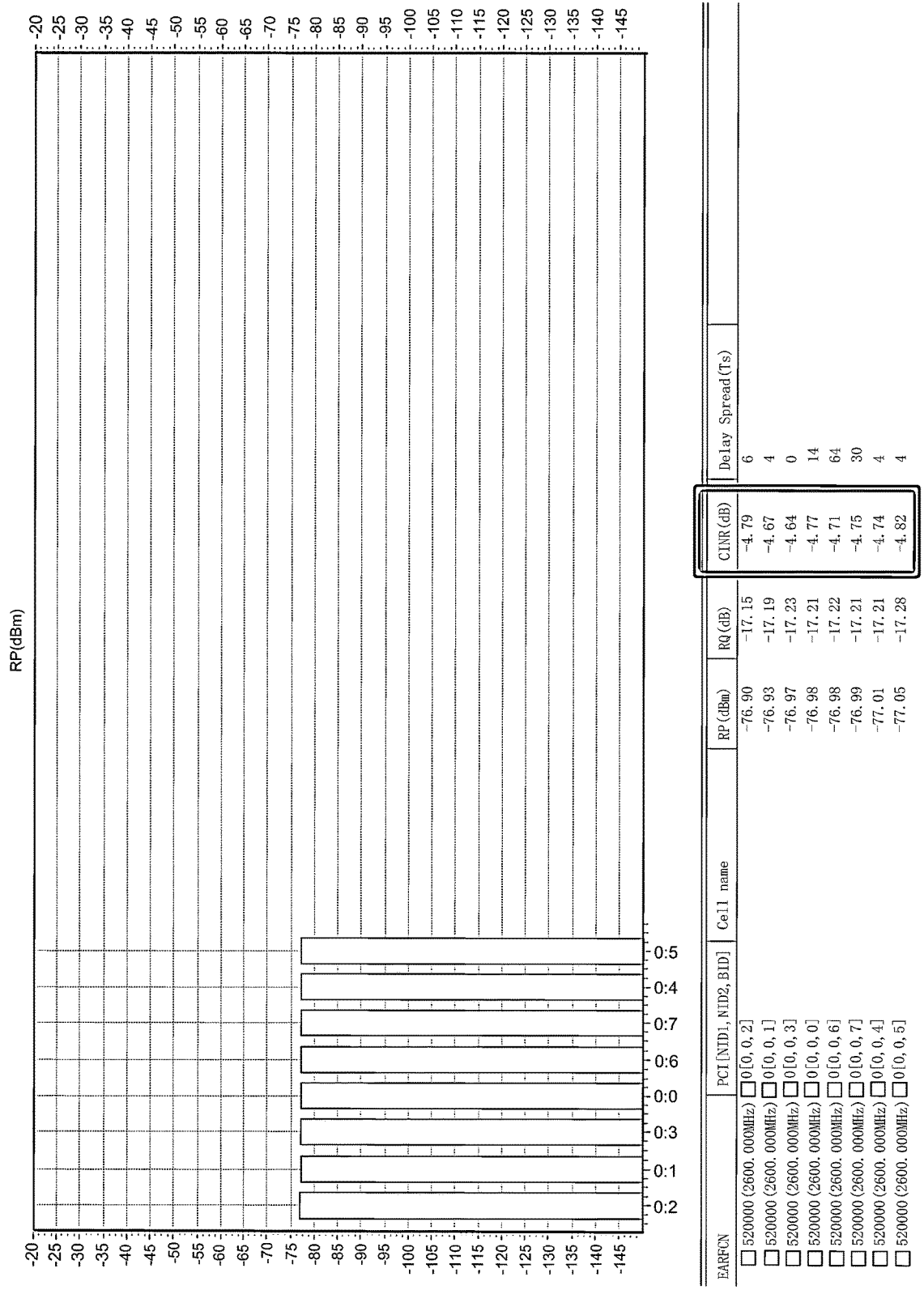
FIG. 4 is a schematic diagram of 5G NR signal quality after predistortion compensation of a 5G NR signal according to a method for implementing predistortion compensation processing for a 5G NR in-band modulated signal according to the present invention.

FIG. 3 shows a schematic diagram of the 5G NR signal quality after predistortion compensation of the 5G NR signal. From the measurement results, both the power of the pilot signal and the signal-to-noise ratio have been greatly improved.

The method for implementing predistortion compensation processing for 5G NR in-band modulated signals of the present invention is adopted, by measuring the power difference of the output continuous wave signal of the modulation channel in advance, the unbalance degree in the test band is predicted, and then the impulse response of the difference channel is calculated; Combined with the characteristics of 5G NR subcarrier allocation and resource occupation, predistortion compensation is performed without the need to modify the device circuit in the channel, thus achieving the purpose of compensating the entire transmission channel. This method not only greatly improves the in-band flatness and phase consistency indicators within the bandwidth of the 5G broadband modulated signal, but also improves the efficiency of research and development and production.

In this specification, the present invention has been described with the reference to its specific embodiments. However, it is obvious still may be made without departing from the spirit and scope of the present invention, various modifications and transformation. Accordingly, the specification and drawings should be considered as illustrative rather than restrictive.

We claim:

1. A method for implementing predistortion compensation processing for a 5G NR in-band modulated signal, the method comprises the steps of:
   (1) first configuring a wideband modulator to output continuous wave signals enabling an output frequency interval of switching signals to be consistent with a bandwidth of a 5G NR subcarrier, and recording a power value Pn of the output continuous wave signal of a modulation channel corresponding to a current frequency through a power meter, the 5G NR subcarrier bandwidths are configured as 15 kHz, 30 kHz, and 60 kHz; then
   (2) calculating power measurement difference values of all points and P0 according-to the power value Pn, taking P0 as a reference point, P0 measured by the power meter, normalizing, and generating a compensation channel impulse response through forming filtering;
   (3) performing inverse Fourier transform on the compensation channel impulse response and converting the compensation channel impulse response into a time domain based power compensation factor;
   (4) carrying out inverse Fourier transform on original baseband signals generated by the 5G NR subcarrier according to different symbols to generate I and Q two paths of baseband signals;
   (5) multiplying the power compensation factor by the I and Q two paths of baseband signals point by point to generate compensated baseband data; and (6) filtering the generated compensated baseband data with a root raised cosine filter with a roll-off coefficient of 0.22, performing digital-to-analog conversion to generate an analog zero intermediate frequency signal, and inputting the analog zero intermediate frequency signal into a broadband demodulator to perform frequency conversion modulation on the 5G NR broadband signal.

2. The method according to claim 1, wherein step (1) further comprises the steps of:
turning on a frequency synthesizer to generate a reference signal for the wideband modulator;
generating a continuous wave signal with the wideband modulator, and sending the continuous wave signal through a fixed-gain RF channel; and
performing a power measurement using a signal receiving device to obtain power measurement values of different frequency points.

3. The method according to claim 1, wherein the compensated baseband data is generated according to the I and Q two paths of baseband signals in step (5), wherein:
the compensated baseband data is generated from the I and Q two paths of baseband signals according to the following formula:

$$Ali(n)=Nli(n) \times H(n);$$

$$Alq(n)=Nlq(n) \times H(n);$$

where, $Nli(n)$ and $Nlq(n)$ are I and Q two paths of baseband signals respectively, $H(n)$ is a power compensation factor, $n=0, 1, \ldots, 4095$.

* * * * *